(12) United States Patent
Bagheri et al.

(10) Patent No.: US 9,043,752 B2
(45) Date of Patent: May 26, 2015

(54) SYSTEM FOR SELECTING SOFTWARE COMPONENTS BASED ON A DEGREE OF COHERENCE

(71) Applicant: International Business Machines Corporation, Armonk, NY (US)

(72) Inventors: Saeed Bagheri, Croton On Hudson, NY (US); Yi-Min Chee, Yorktown Heights, NY (US); Fan Jing Meng, Beijing (CN); Peide Zhong, Briarcliff Manor, NY (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/030,445

(22) Filed: Sep. 18, 2013

(65) Prior Publication Data

US 2014/0258980 A1 Sep. 11, 2014

Related U.S. Application Data

(63) Continuation of application No. 13/787,164, filed on Mar. 6, 2013, now abandoned.

(51) Int. Cl.
G06F 9/44 (2006.01)
G06F 9/445 (2006.01)

(52) U.S. Cl.
CPC ... *G06F 8/70* (2013.01); *G06F 8/60* (2013.01)

(58) Field of Classification Search
CPC .............. G06F 8/61; G06F 8/65; G06F 8/60; G06F 8/71; G06F 2221/0753; G06F 8/447
See application file for complete search history.

(56) References Cited

U.S. PATENT DOCUMENTS

| | | |
|---|---|---|
| 7,194,738 B2 | 3/2007 | Lin et al. |
| 7,676,803 B2 | 3/2010 | Zhao et al. |

(Continued)

FOREIGN PATENT DOCUMENTS

| | | |
|---|---|---|
| WO | 02077844 | 10/2002 |
| WO | 2008065422 | 6/2008 |

OTHER PUBLICATIONS

Padmal Vitharana et al.; Design, Retrieval, and Assembly in Component-based Software Development; 2003 ACM; pp. 97-102; <http://dl.acm.org/citation.cfm?id=948387>.*

(Continued)

*Primary Examiner* — Thuy Dao
*Assistant Examiner* — Cuong V Luu
(74) *Attorney, Agent, or Firm* — Fleit Gibbons Gutman Bongini & Bianco PL; Thomas Grzesik (57) ABSTRACT

Disclosed is a novel system and method to select software components. A set of available software components are accessed. Next, one or more dimensions are defined. Each dimension is an attribute to the set of available software components. A set of coherence distances between each pair of the available software components in the set of available software components is calculated for each of the dimensions that have been defined. Each of the coherence distances are combined between each pair of the available software components that has been calculated in the set of the coherence distances into an overall coherence degree for each of the available software components. Using the overall coherence degree, one or more software components are selected to be included in a software bundle.

10 Claims, 7 Drawing Sheets

(56) References Cited

U.S. PATENT DOCUMENTS

| | | | |
|---|---|---|---|
| 7,752,164 B2 | 7/2010 | Rossiter et al. | |
| 7,895,566 B2* | 2/2011 | Shenfield et al. | 717/107 |
| 8,789,010 B2* | 7/2014 | Lambert et al. | 717/104 |
| 2006/0161892 A1* | 7/2006 | Anand et al. | 717/120 |
| 2006/0195463 A1* | 8/2006 | Bogner et al. | 707/101 |
| 2006/0259904 A1 | 11/2006 | Celli et al. | |
| 2007/0162903 A1* | 7/2007 | Babb et al. | 717/154 |
| 2007/0168956 A1* | 7/2007 | Moore et al. | 717/120 |
| 2007/0169081 A1 | 7/2007 | Zhao et al. | |
| 2007/0271552 A1* | 11/2007 | Pulley | 717/120 |
| 2008/0082973 A1* | 4/2008 | Belkin et al. | 717/155 |
| 2008/0091663 A1 | 4/2008 | Inala et al. | |
| 2008/0127171 A1 | 5/2008 | Tarassov | |
| 2008/0229303 A1* | 9/2008 | Carteri et al. | 717/177 |
| 2010/0070946 A1* | 3/2010 | Herrmann et al. | 717/102 |
| 2010/0131922 A1* | 5/2010 | Shenfield et al. | 717/107 |
| 2011/0119653 A1* | 5/2011 | Culpepper | 717/120 |
| 2012/0159423 A1* | 6/2012 | Becker et al. | 717/102 |
| 2013/0047137 A1* | 2/2013 | Bak et al. | 717/121 |

OTHER PUBLICATIONS

Arnaldo D. Belchior et al.; Quality Characteristics for Software Components Hierarchy and Quality Guides; 2003 Springer; pp. 184-206; <http://link.springer.com/chapter/10.1007/978-3-540-45064-1_9>.*

Vojislav B. Misic; Cohesion is Structural, Coherence is Functional Different Views, Different Measures; 2001 IEEE; pp. 135-144; <http://ieeexplore.ieee.org/xpls/abs_all.jsp?arnumber=915522&tag=1>.*

Morisio; IusWare a methodology for the evaluation and selection of software products; 1997 IEEE; pp. 162-174; <http://ieeexplore.ieee.org/xpls/abs_all.jsp?arnumber=621238>.*

Jean-Christophe Deprez et al.; Comparing Assessment Methodologies for Free/Open Source Software OpenBRR and QSOS; 2008 Springer; pp. 189-203; <http://link.springer.com/chapter/10.1007/978-3-540-69566-0_17>.*

Norman E. Fenton; A Critique of Software Defect Prediction Models; 1999 IEEE; pp. 675-6889; <http://ieeexplore.ieee.org/xpls/abs_all.jsp?arnumber=815326>.*

Marco Commuzzi et al., "A Framework for Multi-level SLA Management", ICSOC/ServiceWave2009, LNCS 6275, pp. 187-196 2010 (Copyright Springer-Verlag Berlin Heidelberg 2010).

John Stanford et al., "Practical Cloud Computing Patterns," Session S311528, Jun. 2009, http://wikis.sun.com/downloads/attachments/116065636/Practical-Cloud-Patterns-S311528.pdf.

Non-Final Office Action dated Jun. 13, 2014 received for U.S. Appl. No. 13/787,164.

* cited by examiner

SYSTEM FOR SELECTING SOFTWARE COMPONENTS BASED ON A DEGREE OF COHERENCE

CROSS-REFERENCE TO RELATED APPLICATIONS

This application is based upon and claims priority from prior U.S. patent application Ser. No. 13/787,164, filed on Mar. 6, 2013, now U.S. Pat. No. [Pending], the entire disclosure of which is herein incorporated by reference in its entirety.

BACKGROUND

The present invention relates to software distributions and more particularly to software selection and software grouping.

A common practice in business is to have software grouping for providing solutions to customers. Bundling or grouping of software components is quite a successful marketing strategy. For example, software providers typically bundle a word processor, a spreadsheet, and a database into a single office suite, rather than offer these products individually.

With the development of cloud computing, it is easier to provision software through a virtualized environment without the traditional installation and manual configuration. In cloud environments, IT solution providers offer users a variety of software components bundled together to meet their business needs. In cloud computing environments, there are multiple categories of software components that are grouped or bundled together. A first category of software components bundled together is Software as a Service (SaaS). Software components are bundled together under SaaS to meet specific requirements of users, with such bundles typically hiding the underlying infrastructure from the end-users. A second category of software components bundled together is the images themselves used to build the virtualized environment. A third category of software components bundled together is the middleware bundles which can be composed into any images to pre-build the software stacks for SaaS.

Providing each of these categories of bundled software components to meet user requirements has resulted in a large proliferation of custom software bundles. This proliferation of customized software bundles is costly. Each custom software bundle or custom software image must be created, configured, tested, and maintained though upgrade and software maintenance practices such as installing software patches. Accordingly, a need exists to easily select and create software bundles.

BRIEF SUMMARY

Disclosed is a novel system and method to select software components. The method begins with accessing a set of available software components, the set of available software components containing at least two software components. Next, one or more dimensions are defined. Each dimension is an attribute to the set of available software components. The dimensions at least include a provider of a software component, an industry a software component is supported, a function a software component performs, an implementation of a software component, and an operating system support for a software component. A set of coherence distances between each pair of the available software components in the set of available software components. A coherence distance is calculated along each of the dimensions that have been defined. An overall coherence degree for each pair of the available software components is computed by combining each distance of the pair of software components. Using the overall coherence degree, one or more software components are selected to be included in a software bundle.

In one example, the set of coherence distances between each pair of software components is calculated using a relationship ontology, assigning similarity factors for each relationship kind in the relationship ontology, and constructing a semantic tree of the set of software components.

In another example, the set of a plurality of available software components being accessed includes one or more binary coded operating systems, middleware applications, and software applications.

In still another example, the software bundle is assembled into a disk image with a specific operating system for use on a cloud-enabled system.

In yet another example, each of the coherence distances are combined that has been calculated in the set of the coherence distances into an overall coherence degree for each of the available software components only when each of the coherence distances are above a predefined threshold. Optionally, the software components selected to be included in a software bundle is performed only when there is no conflict therebetween.

The set of coherence distances may be calculated between each pair of the available software components in the set of available software components along each of the dimensions j that have been defined by a coherence distance $\Phi_{i_1 i_2}^j$ between each pair $(\Pi_{i_1}, \Pi_{i_2})$ of the available software components, using an equation $\Phi_{i_1 i_2}^j = |\beta_{i_1}^j - \beta_{i_2}^j|$ where $\beta_{i_1}^j (\beta_{i_2}^j)$ is a scalar metric value assigned to the component $i_1$ ($i_2$) a dimension j.

Alternatively, the set of coherence distances are calculated between each pair of the available software components in the set of available software components along each of the dimensions j that have been defined by a coherence distance $\Phi_{i_1 i_2}^j(l)$ along path l for each pair $(\Pi_{i_1}, \Pi_{i_2})$ (from $\Pi_{i_1}$ to $\Pi_{i_2}$) of the available software components, using an equation $$\Phi_{i_1 i_2}^j = \sum_{l \in P_{i_1 i_2}} (1 - \alpha_i) \text{ (sum), or } \Phi_{i_1 i_2}^j = \sum_{l \in P_{i_1 i_2}} (1 - \alpha_i) \text{ (product)}$$

where $0 < \alpha_i < 1$. There is an ontology defining the relationships of software components using a directed graph. $P_{i_1 i_2}$ is a set of paths from $\Pi_{i_1}$ to $\Pi_{i_2}$ the ontology graph, and l is a specific path in the set of paths. The value of a, is a non-negative similarity/compatibility factor to define the relationship of two directed neighboring components in path. The distance of $\Phi_{i_1 i_2}^j$ itself is the minimum value of all the paths.

The combining each of the coherence distances between each pair $(\Pi_{i_1}, \Pi_{i_2})$ of the available software components that has been calculated in the set of the coherence distances into an overall coherence degree $\Phi_{i_1 i_2}^j$ for each of the available software components includes using an equation $$\Phi_{i_1 i_2} = \left( \sum_{j=1}^{m} (\Phi_{i_1 i_2}^j)^k \right)^{\frac{1}{k}},$$

m is a number of dimensions.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Overview of Common Selection Algorithms

An "apriori algorithm", as used herein, refers to an algorithm for learning association rules. See online URL (http://en.wikipedia.org/wiki/Apriori_algorithm) which is hereby incorporated by reference in its entirety. Apriori algorithm is designed to operate on databases containing transactions for example, collections of items bought by customers, or details of a website visits. Web-retailers want to cross-sell or up-sell consumers and users. Stated differently, when a user purchases an item A, the retailer is interested in presenting other items the user would want to purchase as well—such as presenting an HDMI cable when a user purchases a flat screen television. This type of selection identifies correlations between purchased items and other items based on a user's transaction record. When the correlation between two items is above a threshold, these two items are considered to be related and hence presented together to the user. See for example, C. Borgelt. Apriori—Finding Association Rules with the apriori algorithm, free computer software under the GLPL, at online URL (http://fuzzy.cs.uni-magdeburg.de/~borgelt/apriori/). Apriori algorithm is used to promote other related products if users buy one product.

"Correlation analysis", as used herein, refers to calculating the spatial or temporal distance between two variables. See online URL (http://en.wikipedia.org/wiki/Correlation_and_dependence) which is hereby incorporated by reference in its entirety. Correlation analysis has been applied to find other key words related to a user's input. Correlation analysis has also been applied to determine user similarity. Typically, Pearson's correlation coefficient is used to calculate user similarity. If two people are similar, they may have similar preferences for product items. Based on the similarity, product providers recommend products for users.

"Profit maximization", as used herein, refers to the process of determining the price and output level the returns the greatest profit. See online URL (http://en.wikipedia.org/wiki/Profit_maximization) which is hereby incorporated by reference in its entirety. Profit Maximization is used to get maximal profit by product providers. They get the maximal profit mainly through sale's policy. And they bundle the products that is not based on user's preference but for economic purpose.

With any of these technologies such as apriori algorithm from data mining domain, correlation analysis from information retrieval domain, and profit maximization. It is a challenge to set a proper threshold. For example, two items may be transitively related even though their correlation is low.

Overview

Unlike traditional correlation analysis, the present invention selects software components to bundle based on a coherence degree. The present invention is not based on history data of software usage. The coherence of software components themselves is analyzed, but not from the historical data from users. The use of coherence factors describes the inner relationship between software components more exactly. Unlike profit maximization, the present invention does not select software components to group based on profit, but rather from their inner relationship.

The present invention identifies software to bundle based on coherence distance analysis between software products. In order to identify the software to bundle, a coherence degree is used to compute the feasibility of bundling software components together by considering multiple dimensions such as provider, industry and function. Some dimensions can be analyzed using simple Euclidean distance values. Other dimensions can be characterized by a relationship tree, where each software product is modeled as a node of a graph structure represented by a semantic tree. For these dimensions, relationships are defined and a similarity/compatibility factor is used to calculate a coherence distance for two components. Product bundles are defined based on this coherence analysis.

Operating Environment

Figure 1:
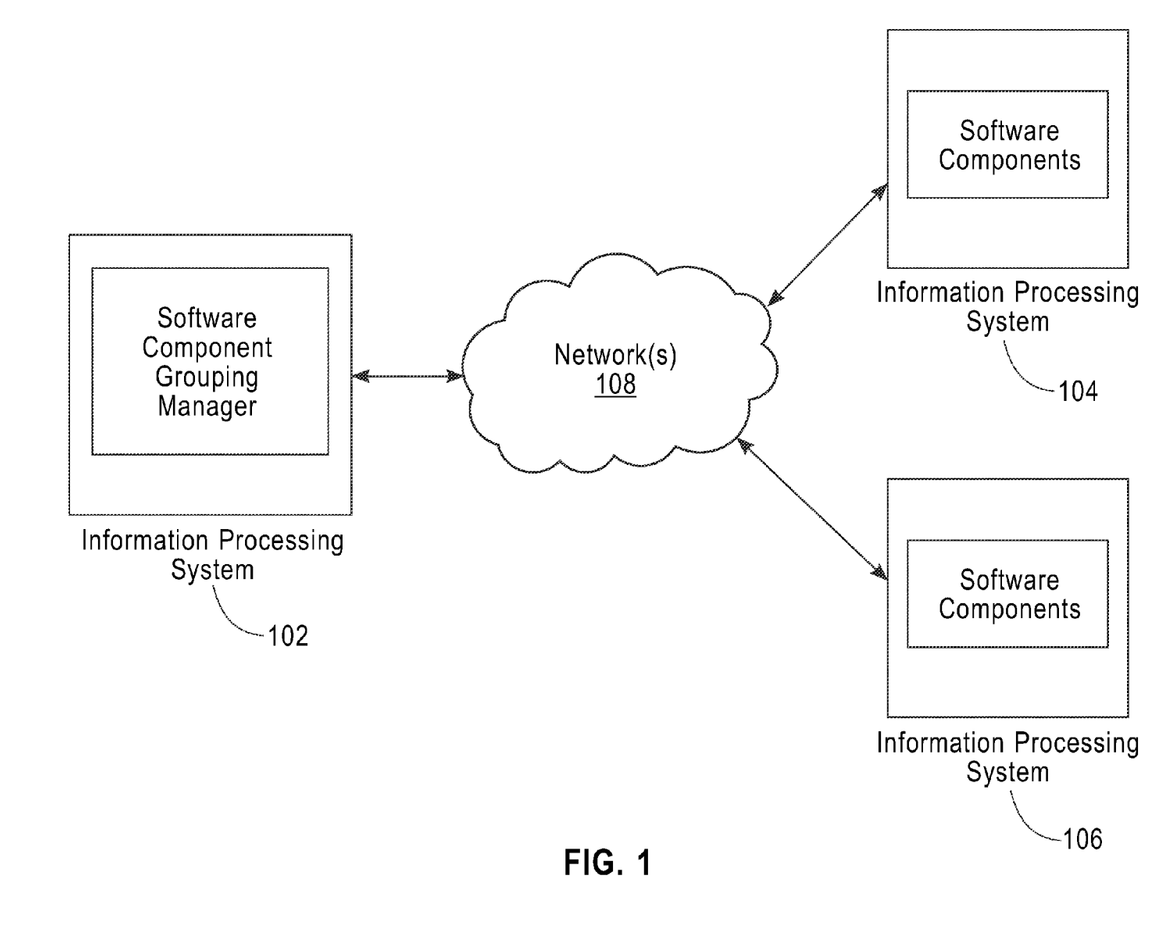
FIG. 1 is a block diagram illustrating an operating environment for grouping software.

FIG. 1 illustrates one example of an operating environment according to one embodiment of the present invention. In particular, FIG. 1 shows a plurality of information processing systems 102, 104, 106 communicatively coupled to one or more networks 108. For example, system 102 runs a software program to carry out a selection of software components being assessed from file systems such as software repositories 104 and 106 over the network(s) 108. The software repositories 104 and 106 can include preconfigured software bundles or just software components or both. Users access/interact with an interactive environment on system 102 via a user interface or programmatically via an application programming interface(s) (API). Examples of the user interface are a web browser, an application, etc. The interactive environment, in one embodiment, is a web page, application, service, etc., that allows a user to specify requirements for a software bundle.

Modeling Examples

First, a bundled software solution is modeled as a graph structure represented by a semantic tree. Each leaf of the semantic tree represents an individual enablement artifact, such as a product from a software vendor. The top of the tree represents the software capabilities and functions to satisfy specific business goals. The traversing from the top to bottom reflects the specification process of finding a software product. The process of coherence analysis start from defining a threshold and is completed by creating multiple partitions of the graph. Coherence degrees are calculated between any two products by combining all the coherence distances from different dimension. Second, a threshold is defined such that two products can be combined together if their coherence is bigger than the defined threshold. Third, a starting point is found and the semantic tree is searched for all software products that can coexist with it. Fourth, all software products that can coexist for all leaf nodes of the semantic tree are identified by repeating the second step. Last, all product sets that their items can coexist each other are outputs as possible product bundles.

The present invention provides the advantage of performing coherence analysis directly based on software products without needing any customer or user data. This saves a tremendous amount of time and the attendant costs by eliminating the requirement to collect this user data. The results of the coherence analysis are provided to cloud solution providers to more efficiently bind software products.

The following mathematical symbols are used to describe the coherence analysis.

n is the number of total software components.

$\Pi_i$ is the software component i, i=1, . . . , n.

T is a set of all available software components, where $T=\{\Pi_1, \Pi_2, \ldots, \Pi_n\}$, $|T|=n$.

$\Phi^j_{i_1 i_2}$ is a coherence distance for a specific dimension j, which is the distance within the dimension j of coherence space between software component $\Pi_1$ and $\Pi_2$.

$\Phi_{i_1 i_2}$ is a coherence degree, which is the overall distance in coherence space between software component $\Pi_1$ and $\Pi_2$. It is measured along multiple dimensions.

Figure 2:
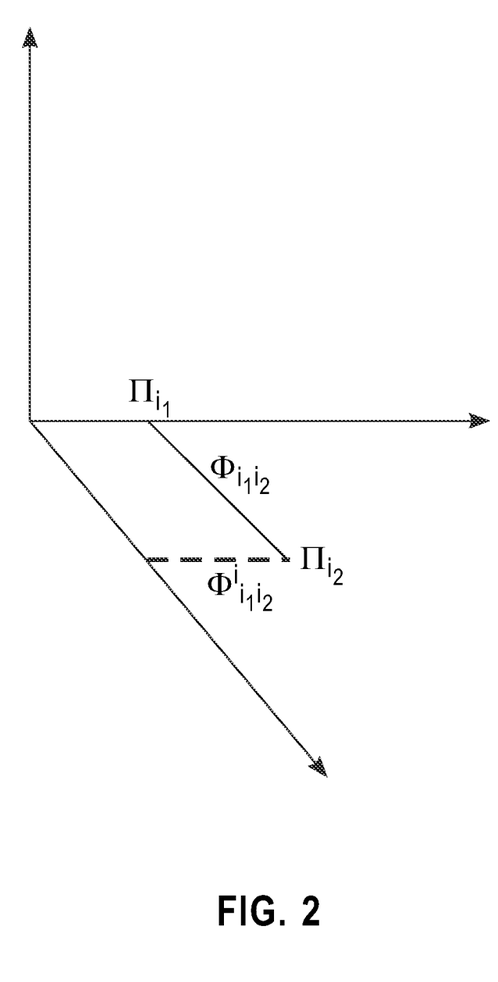
FIG. 2 is an illustration of a coherence factor in different dimensions.

The process of coherence analysis from provider's dimension will be used as an example to illustrate how to calculate a coherence degree $\Phi$. A similar process to calculate the coherence degree in different dimensions. An example of a coherence degree in different dimensions is illustrated in FIG. 2. $\Phi^j_{i_1 i_2}$ is the coherence distance between software component $\Pi_1$ and $\Phi_2$ along coherence dimension j. The following mathematical equation is used to compute coherence degree $\Phi_{i_1 i_2}$ with multiple dimensions, $$\Phi_{i_1 i_2} = \left( \sum_{j=1}^{m} (\Phi^j_{i_1 i_2})^k \right)^{\frac{1}{k}} \quad \text{EQ. 1}$$

In the case of k=2, it is just a well-known Euclidean norm used for geographic distance. Here, m represents the number of coherence dimensions. For example, suppose we have coherence dimensions such as j=1: provider; j=2: implementation; j=3: industry and j=4: function. In this case, m=4. Furthermore, this model (Equation 1) can also be extended by adding weights to each dimension j. Then $$\Phi_{i_1 i_2} = \left( \sum_{j=1}^{m} w_j (\Phi^j_{i_1 i_2})^k \right)^{\frac{1}{k}} \quad \text{EQ. 2}$$

where $w_j$ is the weight chosen for dimension j, and each weight must have a non-positive value. It is important to note that the distance need not be symmetric (i.e. $\Phi_{i_1 i_2}$ is not necessarily equal to $\Phi_{i_2 i_1}$).

The selection of the norm k typically relies on the characteristics of the dimension. For those dimensions that can be measured in scalar non-negative values with linear scale, k can be chosen to be 1. Examples of such dimensions include cost/expense range, the memory requirement for components, and bandwidth requirements. In this case, the equation for coherence distance between components $i_1$ and $i_2$ in dimension j becomes the $L_1$, (k=1) norm, which is given by:

$$\Phi^j_{i_1 i_2} = |\beta^j_{i_1} - \beta^j_{i_2}| \quad \text{EQ. 3}$$

where $\beta^j_{i_1}$ and $\beta^j_{i_2}$ are simply the measurement of the attribute in the dimension j. For example, if the dimension j represents memory requirement, and software component $i_1$ requires 512 megabytes of memory and software component $i_2$ requires 768 megabytes, then $\beta^j_{i_1}=512$ MB, $\beta^j_{i_2}=768$ MB, and $\Phi^j_{i_1 i_2}=1512-7681=256$. The use of this distance measure implies that components with similar memory requirements should stay together.

In the case of choosing k=2, then $$\Phi^j_{i_1 i_2} = \sqrt[2]{(\beta^j_{i_2,1} - \beta^j_{i_1,1})^2 + (\beta^j_{i_2,2} - \beta^j_{i_1,2})^2} \quad \text{EQ. 4}$$

where each component i in dimension j is characterized by a pair of values $(\beta^j_{i,1}, \beta^j_{i,2})$. For example, if components have been developed for a particular geographic location, the $\beta$ values could represent the latitude and longitude of that location.

Not all the dimensions can be measured using scalar distance like cost, memory and bandwidth. One very important dimension is the manageability (due to compatibility and business functionality) of two candidate software components which co-exist in one bundle. For example, if you have components requiring different operating systems, then bundling those components together will cause manageability problems, and make the bundle not feasible to be consumed. For such dimensions, concepts of relationship, such as class, subclass, conflict and so on, will be used to define the relationship of two components.

Figure 3:
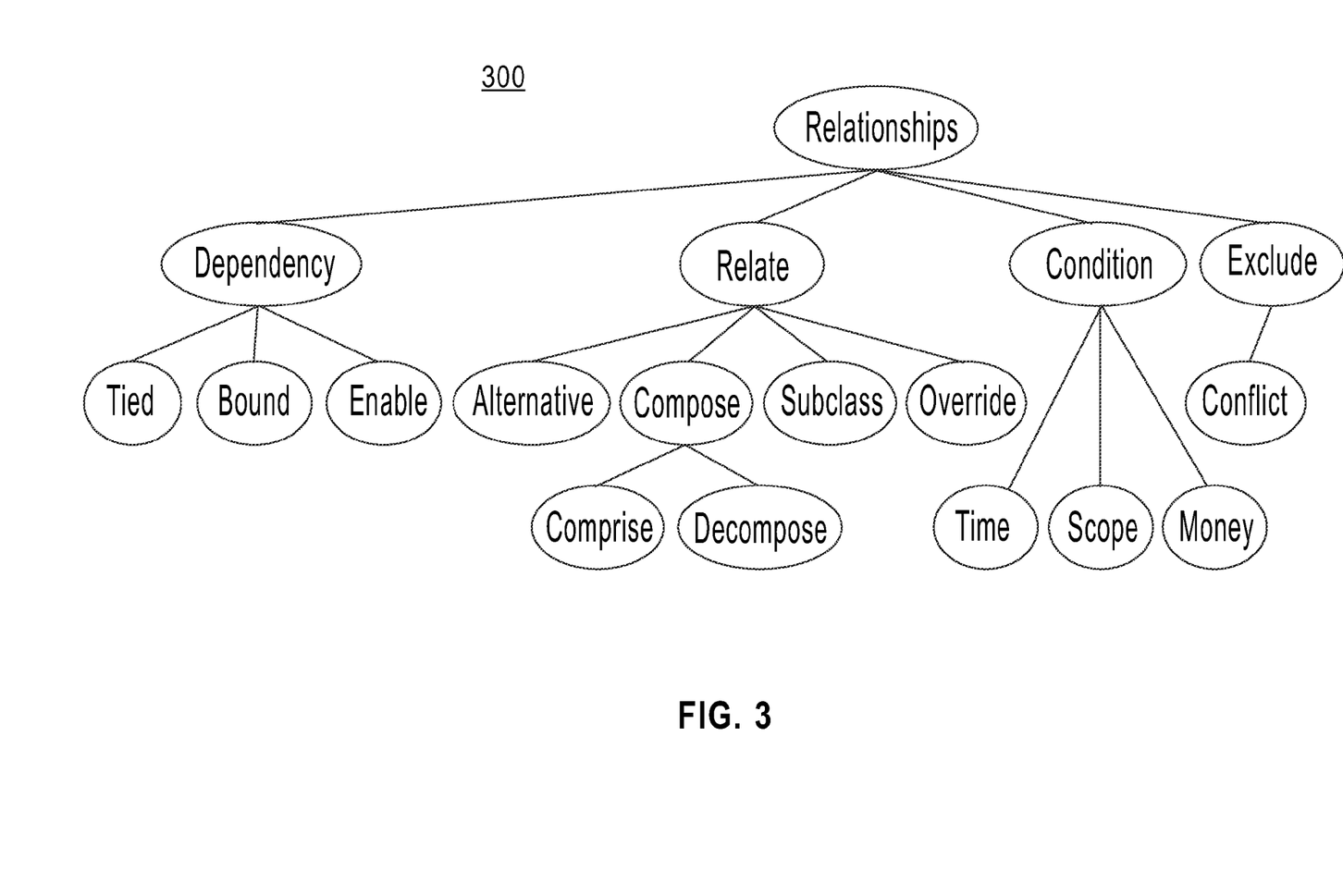
FIG. 3 is an illustration of a relationship tree or a relationship ontology.

Turning now to FIG. 3 shown is an example relationship tree 300. This relationship tree 300 is defined as a generic solution in our algorithm; therefore, it can be used by a specific example (coherence graph—CG) 400 in FIG. 4. A specific example 400 should be constrained by the relationship ontology. The relationship property of an edge can be converted to directed edge with similarity/compatibility value assigned according to the relationship property. A coherence graph (CG) is used to calculate the coherence distance $\Phi^j_{i_1 i_2}$ along each dimension j. To build the CG, a relationship tree is used along with understanding of the software component relationship in that dimension j. We will use relationship ontology from software products dimension as an example to illustrate how to build relationship ontology. Furthermore, a similarity factor $\alpha_i$ for each relationship to show how similar two software components are with this relationship.

Figure 4:
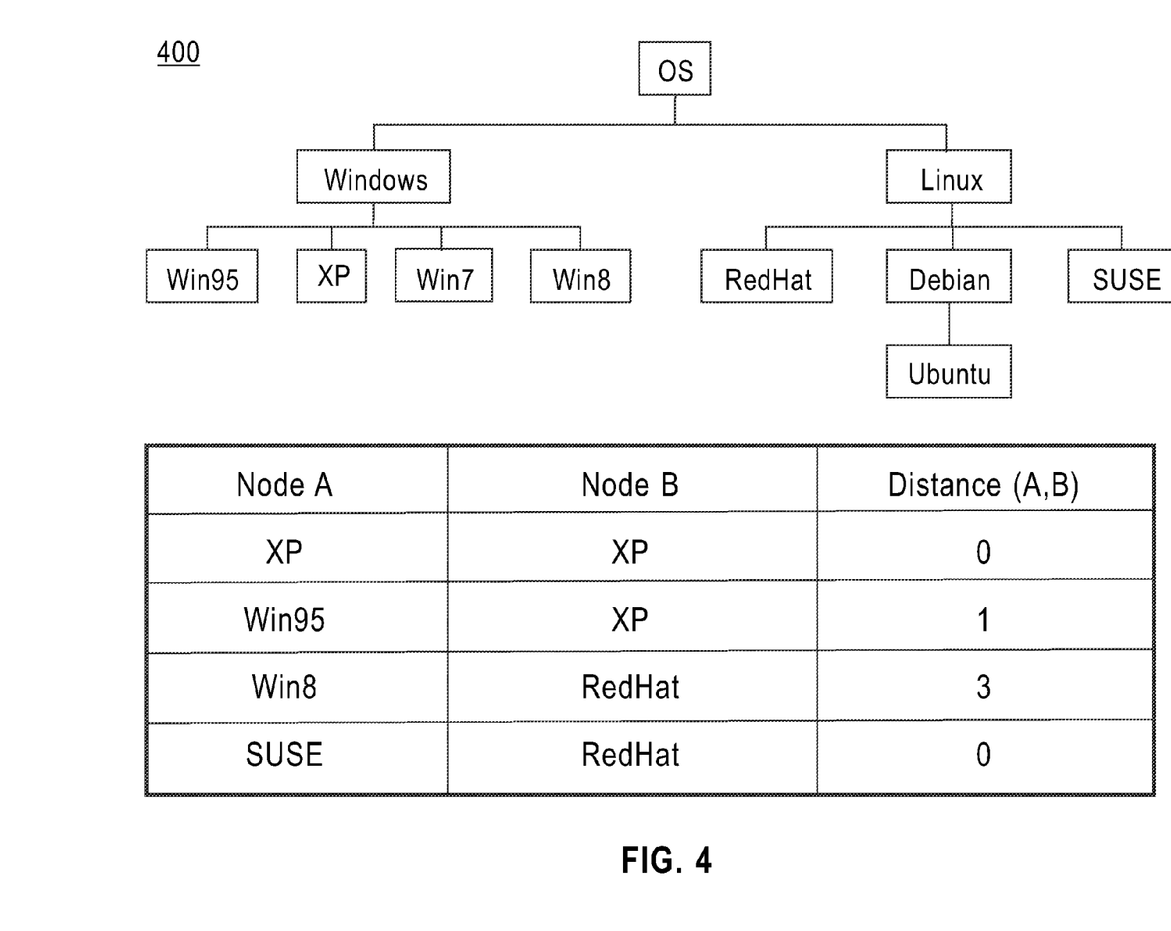
FIG. 4 is a specific example of a semantic tree of FIG. 3.
Figure 5:
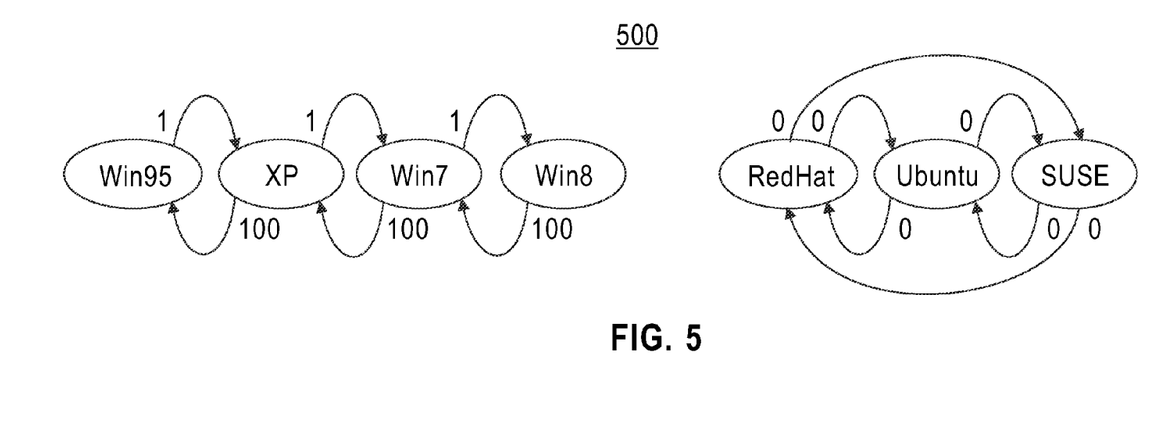
FIG. 5 is a directed graph of the example from FIG. 4.

Turning to FIG. 5, shown is a directed graph 500 of the specific example in FIG. 4. Once the CG is built, the similarity factors $\alpha_i$ are used along with the CG to calculate the coherence distance. A value is assigned to each edge of the graph. For example, for different versions of the Windows operating system, backwards compatibility relationships exist from Windows 95 to Windows XP, Windows XP to Windows 7, and Windows 7 to Windows 8. That means applications developed for Windows 95, Windows XP, and Windows 7 are still being able to execute in a Windows 8 environment. We assign edge value 1 for Windows 95 to Windows XP, Windows XP to Windows 7, and Windows 7 to Window 8. However, since forwards compatibility is not typically maintained, we assign the value 100 to edges for Windows 8 to Windows 7, Windows 7 to Windows XP, and Windows XP to Windows 95, as we have to modify any applications developed specifically for Windows 8 if we want it to be executable on Windows 7 (and the same relationship holds for Windows 7, Windows XP and Windows 95). For different Linux operating systems, as an application developed for RedHat, Ubuntu and SUSE can be executed on other Linux OSes, we assign an edge value of 0 for these compatibility relationships.

In particular, for the $j^{th}$ CG, and software component $\Pi_{i_1}$ and $\Pi_{i_2}$, the following equation is used:

$$F^{j}_{i_1 i_2}(l) = \overset{o}{\underset{l \in R_{i_1 i_2}}{a}} a_l \qquad \text{EQ. 5}$$

where $P_{i_1 i_2}$ is a set of paths from $\Pi_{i_1}$ to $\Pi_{i_2}$ on the ontology graph, and l is a specific path in the set of paths. The value of $\alpha_l$ is a non-negative similarity/compatibility factor to define the relationship of two directed neighboring components in path. The distance of $\Phi_{i_1 i_2}{}^j$ itself is the minimum value of all the paths. For example: path 310 from Windows to Linux of software ontology is $P_{WindowsLinux}$={subclassof, conflict}. In case there are multiple path between $\Pi_1$ and $\Pi_2$, the path which results in the smallest computed coherence distance $\Phi_{i_1 i_2}$ is selected.

Based on the specific business requirements that are driving the grouping of software components, the user determines both the set of dimensions for the coherence analysis and the specific function to be used for measuring coherence distance $\Phi_{i_1 i_2}$ in each of the dimensions.

Figure 6:
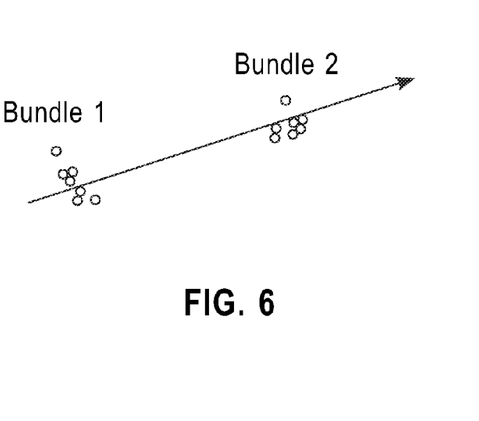
FIG. 6 is a two-dimensional illustration of using the coherence degree calculated to bundle software components.
Figure 7:
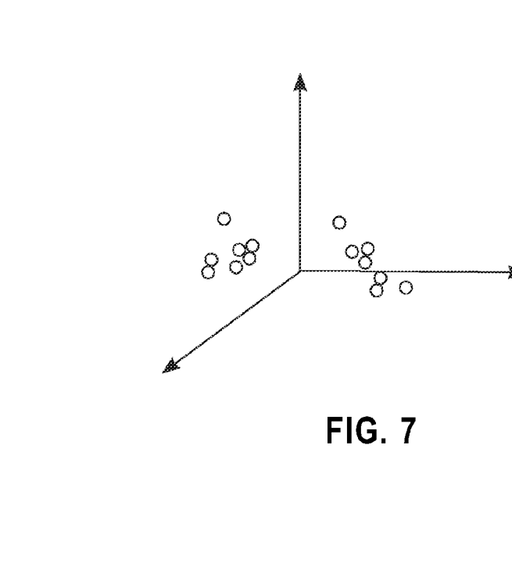
FIG. 7 is a three-dimensional illustration of using the coherence degree calculated to bundle software components.

Next, the user determines the method for computing coherence degree $\Phi_{i_1 i_2}$ from the coherence distances. After, the coherence degree is found, the software components can be bundled by using coherence degree illustrated in FIGS. 6 and 7 as follows.

Figure 8:
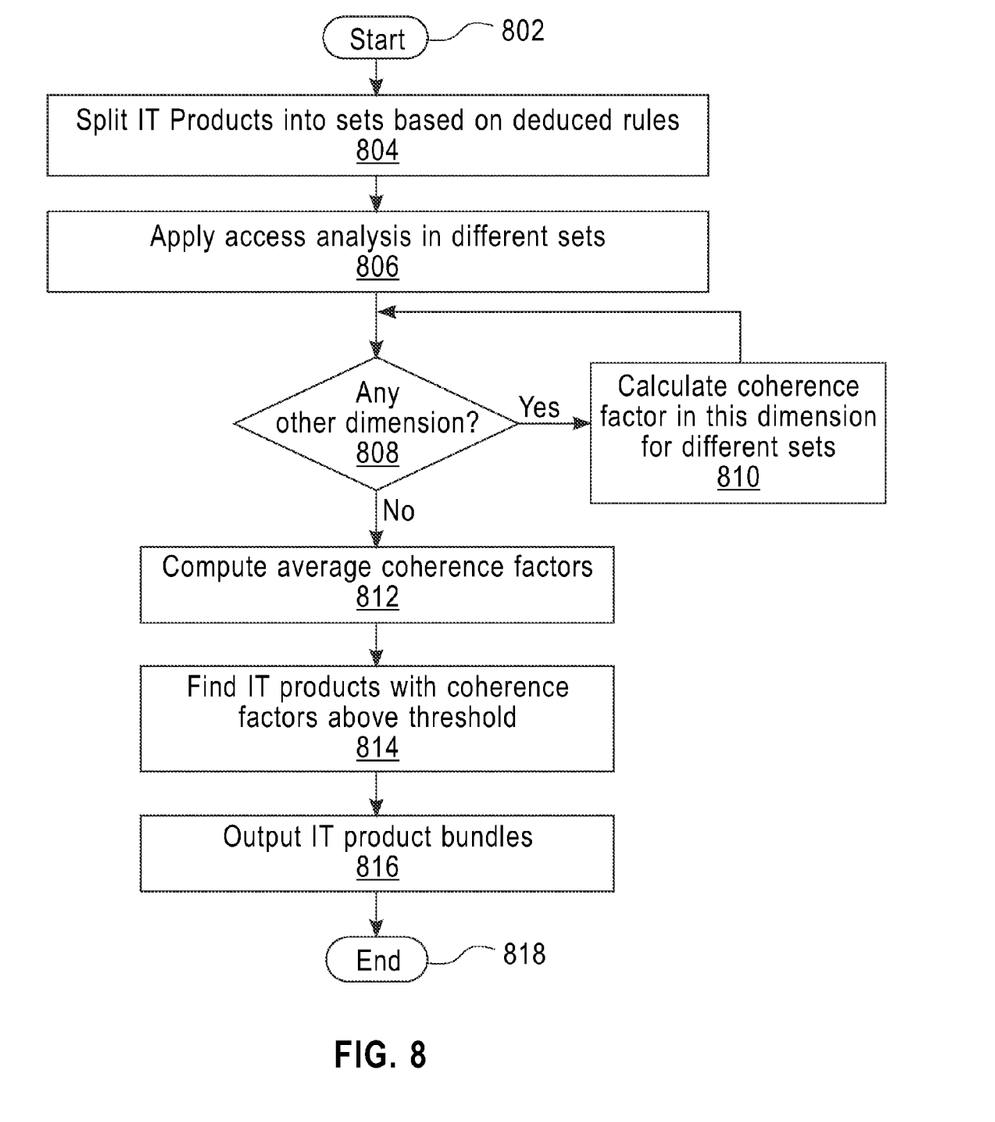
FIG. 8 is a flow chart of an operational phase of carrying out the present invention.

Turning to FIG. 8, shown is a flow chart of software component selection and grouping. The process begins in step 802 and immediate proceeds to step 804 in which software and hardware (IT Products) are split into two or more sets based on deduced rules. It is important to note that this is done without the need to considering pre-existing image or pre-existing bundle.

Step 806 is an optional step to make certain restrictions to candidates. By applying certain restrictions will reduce the number of candidate components that need to be considered for bundling. Some obvious restrictions could be the characteristics of the potential clients, and the software components themselves. For example, the industry sectors, vendor of software, the supporting operating system, and so on.

Coherence distances are calculated in all dimensions in steps 808 and 810 by rendering the mathematical model on same set. The coherence degree of two candidate components considering all the dimensions can be computed using Equation 1, where we can simply choose k=2.

In step 812, an average coherence degree is computed for all the coherence distances calculated in steps 804 through 810. The average coherence degree is computed as the average coherence distance of all the pair-wise candidate components, this number reflects the coherence degree based on selected dimension and the measurement chosen.

Next, in step 814, a set of pre-defined software components which must be grouped together as a cloud image. We can repeat above steps to create multiple sets of software components into multiple cloud images. This bundling input could come from client requirements, or existing packaging practice. A set of pre-defined software is not a null or empty set. In one example, neighbors with coherence degree constrained by a threshold are found. Alternatively, find the k nearest neighbors, where k is chosen based on some business or technical constraint on the maximum size of a grouping.

The process completes in step 816 in which the IT product bundles are presented to a user as an output and the process ends in step 818.

In another example, a new component is added into one or more of the existing portfolio of images. The new component is added by computing and sorting the coherence degrees to each software image or software bundle. Then those software images or software bundles with minimal coherence degrees are selected to the candidate component to update the images to create new images. The computation of the coherence degree of a component to an image (with multiple components) as following: 1) Compute the coherence degree pairwise for each component of existing image with the candidate component; and 2) compute the average of the coherence degrees of above step as the coherence degree of a software component to an existing image.

Information Processing System

Figure 9:
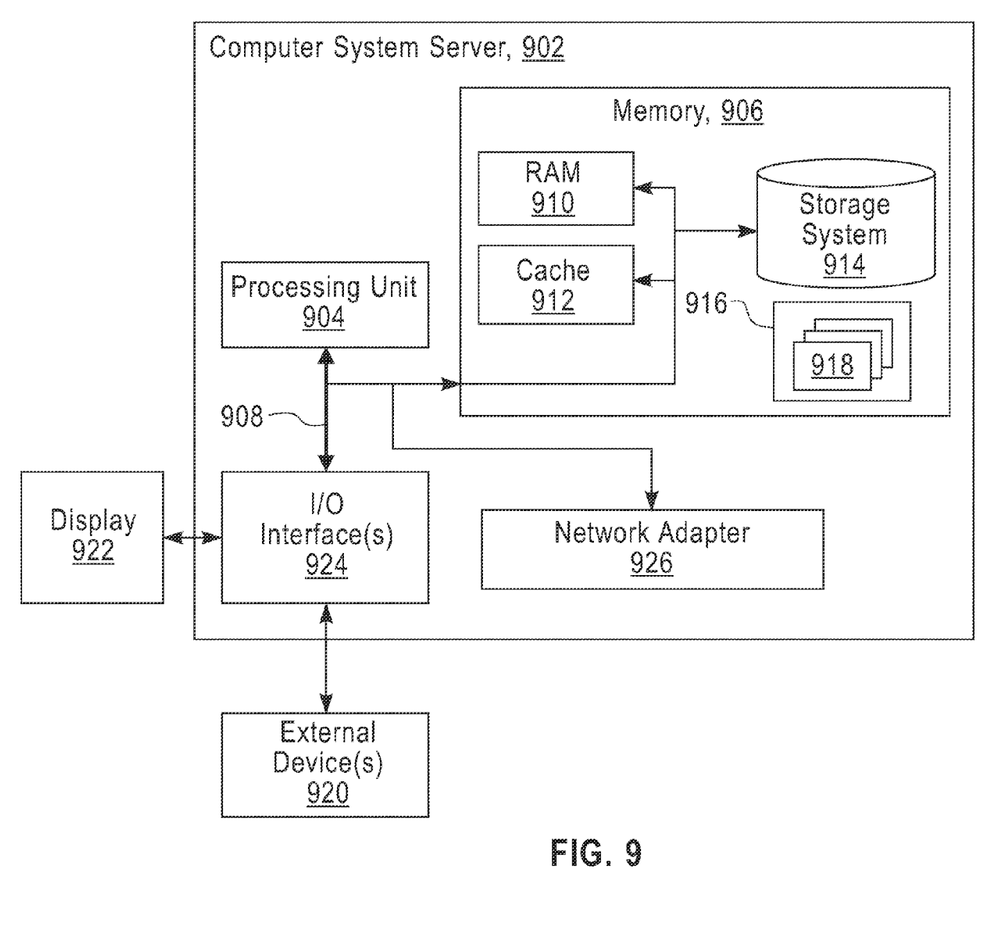
FIG. 9 is a block diagram illustrating a detailed view of an information processing system for carrying out the operation of FIG. 8.

FIG. 9 illustrates one example of a detailed view of an information processing system for carrying out the operation of FIG. 8, which can be deployed in the software component grouping manager server 102. Any suitably configured processing system can be used as the information processing system 902 in embodiments of the present invention. The components of the information processing system 902 can include, but are not limited to, one or more processors or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 906 can also include computer system readable media in the form of volatile memory, such as random access memory (RAM) 910 and/or cache memory 912. The information processing system 902 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of an embodiment of the present invention.

Program/utility 916, having a set of program modules 918, may be stored in memory 906 by way of example, and not limitation, as well as an operating system, one or more application programs (e.g., the software component grouping manager 102), other program modules, and program data. Each of the operating system, one or more application programs, other program modules, and program data or some combination thereof, may include an implementation of a networking environment. Program modules 918 generally carry out the functions and/or methodologies of embodiments of the present invention.

The information processing system 902 can also communicate with one or more external devices 920 such as a keyboard, a pointing device, a display 922, etc.; one or more devices that enable a user to interact with the information processing system 902; and/or any devices (e.g., network card, modem, etc.) that enable computer system/server 902 to communicate with one or more other computing devices. Such communication can occur via I/O interfaces 924. Still yet, the information processing system 902 can communicate with one or more networks such as a local area network (LAN), a general wide area network (WAN), and/or a public network (e.g., the Internet) via network adapter 926. As depicted, the network adapter 926 communicates with the other components of information processing system 902 via the bus 908. Other hardware and/or software components can also be used in conjunction with the information processing system 902. Examples include, but are not limited to: microcode, device drivers, redundant processing units, external disk drive arrays, RAID systems, tape drives, and data archival storage systems.

Non-Limiting Examples

The OS fingerprinting in the present invention can be leveraged for other business cases including: Bring Your Own Device (BYOD) business policies, and enhances mobile security. Add layers for finer grain classification and identification of VMs. Differential DHCP Lease does not require any protocol changes: Can be deployed as a software solution in DHCP servers; and removes the burden of updating all leases when new devices are introduced.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of non-transitory computer program product or computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems), and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium or computer program storage product that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus to produce a software bundle of software components, the apparatus comprising:
    a file system comprising binary coded software components;
    a memory;
    a processor communicatively coupled to the memory and the file system, where the processor is configured to perform
        accessing a set of available software components, the set of available software components comprising at least two software components;
        defining one or more dimensions, each dimension being an attribute to the set of available software components, wherein the dimensions include at least one of a provider of a software component, an industry a software component is deployed, a function a software component performs, an implementation of a software component, and an operating system used for a software component;
        calculating, with the processor, a set of coherence distances between each pair of the available software components in the set of available software components along each of the dimensions that have been defined;
        combining each of the coherence distances between each pair of the available software components that has been calculated in the set of the coherence distances into an overall coherence degree for each of the available software components, wherein the combining each of the coherence distances that has been calculated in the set of the coherence distances into an overall coherence degree for each of the available software components only when each of the coherence distances are above a predefined threshold; and
        selecting, using the overall coherence degree, one or more software components to be included in a software bundle.

2. The apparatus of claim 1, wherein the calculating, with the processor, the set of coherence distances between each pair of software components includes using a relationship ontology, assigning similarity factors for each relationship kind in the relationship ontology, and constructing a semantic tree of the set of software components.

3. The apparatus of claim 1, wherein the accessing a set of a plurality of available software components, includes accessing one or more binary coded
    operating systems,
    middleware applications, and
    software applications.

4. The apparatus of claim 1, further comprising:
    assembling the software bundle into a disk image for use on a cloud-enabled system.

5. The apparatus of claim 1, wherein the selecting, using the overall coherence degree, one or more software components to be included in a software bundle only when there is no conflict therebetween.

6. A non-transitory computer program product to select software components, the computer program storage product comprising instructions configured to perform a method comprising:
    accessing a set of available software components, the set of available software components comprising at least two software components;
    defining one or more dimensions, each dimension being an attribute to the set of available software components, wherein the dimensions include at least one of a provider of a software component, an industry a software component is deployed, a function a software component performs, an implementation of a software component, and an operating system used for a software component;
    calculating, with a processor, a set of coherence distances between each pair of the available software components in the set of available software components for each of the dimensions that have been defined;
    combining each of the coherence distances between each pair of the available software components that has been calculated in the set of the coherence distances into an overall coherence degree for each of the available software components; and
    selecting each of a pair of available software components in the set of available software components to be included in a software bundle based on the overall coherence degree for the pair of available software components being above a given threshold.

7. The non-transitory computer program product of claim 6, wherein the calculating, with the processor, the set of coherence distances between each pair of software components includes using a relationship ontology, assigning similarity factors for each relationship kind in the relationship ontology, and constructing a semantic tree of the set of software components.

8. The non-transitory computer program product of claim 6, wherein the accessing a set of a plurality of available software components, includes accessing one or more binary coded
    operating systems,
    middleware applications, and
    software applications.

9. The non-transitory computer program product of claim 6, further comprising:
    assembling the software bundle into pre-configured an image or multiple images for use on a cloud-enabled system.

10. The non-transitory computer program product of claim 6, wherein the combining each of the coherence distances that has been calculated in the set of the coherence distances into an overall coherence degree for each of the available software components only when each of the coherence degree of any two components are constrained by a predefined threshold.

* * * * *